Dec. 11, 1962  J. H. ERWIN  3,068,160
MECHANICALLY-JOINED PLATE-TYPE ALUMINUM-CLAD FUEL ELEMENT
Filed March 24, 1960

BEFORE PRESSING

AFTER PRESSING

BEFORE PRESSING

AFTER PRESSING

INVENTOR.
Jesse H. Erwin
BY
ATTORNEY

3,068,160
MECHANICALLY-JOINED PLATE-TYPE ALUMINUM-CLAD FUEL ELEMENT

Jesse H. Erwin, Concord, Tenn., assignor to the United
States of America as represented by the United States
Atomic Energy Commission
Filed Mar. 24, 1960, Ser. No. 17,443
7 Claims. (Cl. 204—154.2)

The present invention relates generally to the neutronic reactor art, and more particularly to an improved method for fabricating plate-type fuel elements for neutronic reactors.

The plate-type fuel element—also known as the MTR-type fuel element—comprises a multiplicity of fissionable-fuel-bearing plates held in parallel relationship by a pair of supporting side members. The side members are provided with spaced parallel recesses, each of which accept one lateral edge of each plate. Such elements are used in many operating reactors, among which is the reactor described in Patent No. 2,831,806, issued April 22, 1958, in the name of Eugene P. Wigner, for "Neutronic Reactor."

Fabrication of these fuel elements has been accomplished, heretofore, by brazing the fuel-bearing plates into the supporting side members. Inherent in the brazing technique is the use of a brazing flux, and many of the fluxes used in the fabrication of plate-type fuel elements are extremely corrosive compositions and may contain, among other things, materials which are highly absorptive of neutrons.

The brazing method of fabrication is disadvantageous in several respects. First, brazing is complex and costly, in terms of both materials and labor. Secondly, brazing leaves the fuel element in a softened condition. Thirdly, any brazing flux which is not removed may induce corrosion in the fuel element during reactor service, and also may be absorptive with respect to neutrons. Lastly, brazed fuel units are difficult to disassemble for fuel and fission-product-recovery processing.

It is, therefore, a general object of the invention to provide a method for fabricating plate-type fuel elements which does not include brazing or the use of brazing fluxes.

Another object of the invention is to provide a fuel element fabrication method which is less complex and costly than the brazing technique.

Another object of the invention is to provide a fuel element fabrication method which leaves the finished element in a work-hardened condition.

A further object of the invention is to provide a fuel element fabrication method which does not introduce either neutron-absorptive or corrosive materials into the finished fuel element.

A still further object of the invention is to provide a fuel element fabrication method which leaves the finished fuel element in condition for easy disassembly.

Other objects of the invention will become apparent from an examination of the following description and the drawings appended thereto, wherein.

In accordance with the present invention, a method for fabricating fuel elements is provided which comprises dove-tailing the lateral edges of the fuel plates, inserting the dove-tailed edges into corresponding recesses which are provided in a pair of supporting side members, and compressing the supporting side members in a transverse direction substantially parallel to the sides thereof.

The joint which results from an application of this method is comparable in strength to the joint effected by the brazing technique. No brazing flux is needed with the method; therefore, all disadvantages associated with the utilization of a brazing flux are obviated. Moreover, although the strength of the resulting fuel element is high, the element can be easily disassembled for fuel and fission-product recovery.

The above-described method is applicable to plate-type fuel elements generally, and is not limited to elements of any particular composition or size. Of course, the invention is applicable only to fuel elements in which the supporting side members are composed of a relatively ductile material. It is equally applicable to curved and straight-plate fuel elements.

The term "dove-tailing" as used herein means, and is hereby defined as, any technique whereby the thickness of a fuel-bearing plate is made greater at or near its lateral edge than at at least one point nearer the center line of the plate. FIGS. 1–5 illustrate various "dove-tailed" edges within the scope of the present invention. Other equivalent shapes will be apparent to those skilled in the art.

Figure 5:
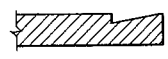
Figure 1:
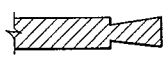
Figure 2:
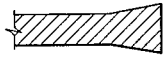

It will be noted that the dove-tailed shapes illustrated by FIGS. 1 and 5 can be formed by any convenient technique, such as rolling, machining, or pressing grooves into the surface or surfaces of the fuel-bearing plates near the lateral edges of the plates. It will be further noted that these grooves are characterized by an increase in depth as the plate is traversed transversely from its lateral edge to a point nearer the center line of the plate. This form of dove-tailing is preferred for use in the invention because of its simplicity and applicability to existing forms of fuel-bearing plates.

Generally, it is preferred that the compression of the supporting side members be accomplished at elevated temperatures, since ductility usually increases with an increase in temperature. It is also preferable to accomplish the compression within the confines of a massive jig. It has been found that when the compression is accomplished within a heated jig, an advantage in addition to the advantage of increased ductility will result. In the heated-jig technique, the fuel plates and side members are assembled at room temperature, and the resulting assembly is placed in a massive pre-heated jig. Since at this stage of fabrication the fuel plates rest loosely in the recesses of the supporting side members, the plates are heated very little by a rise in temperature of the side members. Thus, the heated jig causes a temperature rise and an accompanying thermal expansion in the side members without a temperature rise and expansion in the plates. This preferential heating of the side members provides a stronger joint because, upon cooling the recesses in the side members shrink due to thermal contraction.

Figure 6:
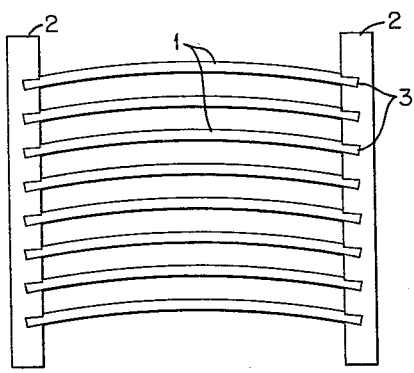
FIG. 6 is a transverse elevation view of a curved plate-type fuel element.
Figure 9:
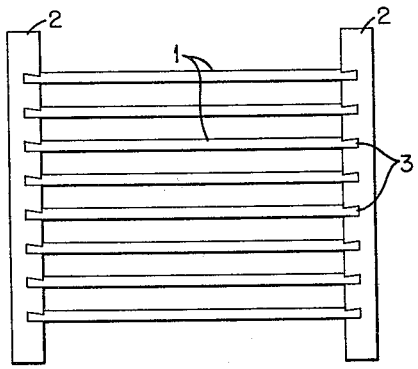
FIG. 9 is a transverse elevation view of a straight plate-type fuel element.

To facilitate the understanding of the invention, reference is made to FIGS. 6–12 of the accompanying drawings, wherein an application of our invention utilizing the preferred type of dove-tailing is illustrated. FIGS. 6 and 9 illustrate, in transverse elevation, a curved-plate fuel element and a straight plate fuel element, respectively. Referring to those figures, a multiplicity of fissionable-fuel-bearing plates 1 are maintained in parallel relationship by supporting side members 2, the latter members being provided with spaced parallel recesses 3 into which the lateral edges of the fuel-bearing plates 1 fit.

Figure 7:
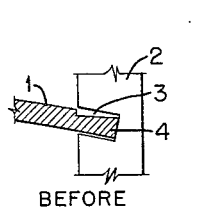
FIG. 7 is a detailed view of a plate-side member joint of the element of FIG. 6 prior to pressing.
Figure 8:
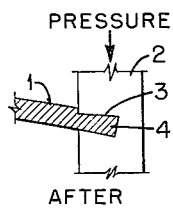
FIG. 8 is a detailed view of a plate-side member joint of the element of FIG. 6 subsequent to pressing.
Figure 10:
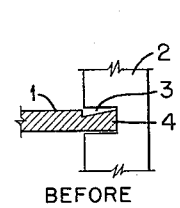
FIG. 10 is a detailed view of a plate-side member joint of the element of FIG. 9 prior to pressing.
Figure 11:
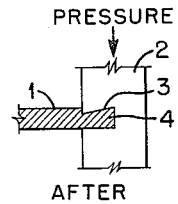
FIG. 11 is a detailed view of a plate-side member joint of the element of FIG. 9 subsequent to pressing; and, FIG. 12 is an elevation view of a jig suitable for use in the invention, and a fuel element therein.
Figure 3:
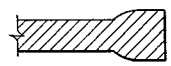
FIGS. 1–5 are transverse sectional views of various shaped fuel plates suitable for use in the present invention.
Figure 4:
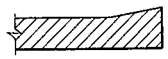

Referring next to FIGS. 7 and 8, which illustrate in greater detail a side member-fuel plate joint of the curved-plate fuel element of FIG. 6 before and after pressing, respectively, it can be seen from FIG. 7 that the lateral edge 4 of fuel plate 1 is dove-tailed in accordance with the meaning of that term as defined herein. In accordance with the invention, the dove-tailed edge 4 is inserted into the recess 3 provided in side member 2, and the side member is compressed in a transverse direction parallel to the side of side member 2, as is indicated by the arrows. The resulting plastic deformation of side member 2 about the dove-tailed edge is illustrated by FIG. 8. FIGS. 10 and 11 illustrate the invention as applied to the straight-plate fuel element of FIG. 9.

Figure 12:
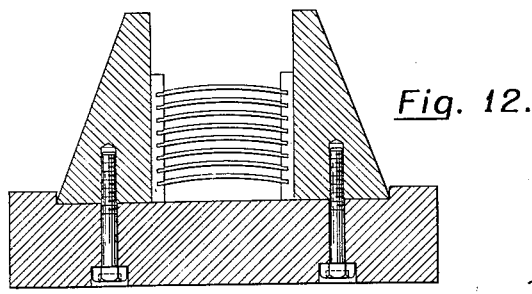

As was stated above, it is preferable to conduct the compression step in a heated jig. FIG. 12 shows, in elevation, a suitable jig for this purpose, with a fuel element in position therein.

In order to avoid an introduction of curvature into straight plates or a distortion of the curvature in curved plates, it is necessary that the side walls of the recesses be substantially parallel to a transverse center line of the plates at their edges. This requirement is illustrated in FIGS. 7 and 8, where the recess 3 slopes downwardly into the supporting side member 2, thereby compensating for the curvature of fuel plate 1.

Although there is nothing critical about recesses dimensions, the following observations are appropriate. In general, the width, that is, the distance between sides of the recess, should be as small as possible in order to minimize the plastic deformation required to effect joining of the side member and fuel plate. As to depth, the deeper the recess is, the stronger the resulting joint becomes.

As a further illustration of the invention, the following example is offered;

*Example*

Nineteen plates, each being 24 inches long, 2.84 inches wide, and 60 mils in thickness were prepared from commercially pure aluminum. The longitudinal edges of each of the plates were dove-tailed in accordance with the shape shown in FIG. 5 by rolling therein grooves having a width of 95 mils and a maximum depth of 10 mils. Two side members, each being 24 inches long, 0.297 inch in thickness, and 3.625 inches wide, and composed of commercially pure aluminum, were each provided with nineteen parallel longitudinal recesses equally spaced 0.10 inch apart. These recesses were 90 mils deep, 70 mils wide, and inclined at an angle of 12° with respect to a line normal to the major surfaces of the side members. A fuel element was assembled by placing the dove-tailed edges of each of the nineteen plates into corresponding recesses in the side members. The resulting assembly was placed into a jig similar to the one shown in FIG. 12 which had been preheated to 300° C., and after the elapse of several minutes the side members were compressed to a pressure of 18,000 p.s.i. After the assembly had cooled, it was found that all joints were sound and that the assembly was satisfactory in all respects. A test revealed that a force of 300 lbs. per linear inch of joint was required to separate the plates from the side members.

The above description of one form of the invention was offered for illustrative purposes only, and should not be interpreted in a limiting sense. It is intended that the invention be limited only by the claims appended hereto.

Having thus described the invention, what is claimed is:

1. In a method of fabricating neutronic reactor fuel elements, which comprise a plurality of parallel fuel-bearing plates and a pair of side members supporting said plates, by inserting the lateral edges of said plates into corresponding recesses in said side members, and effecting a bond therebetween, an improved method for effecting said bond, which comprises dove-tailing the lateral edges of said fuel plates, inserting the resulting dove-tailed edges into said corresponding recesses in said supporting side members, and compressing said supporting side members in a transverse direction substantially parallel to the sides thereof.

2. In the method of fabricating neutronic reactor fuel elements, which comprise a plurality of parallel fuel-bearing plates and a pair of side members supporting said plates, by inserting the lateral edges of said plates into corresponding recesses in said side members, and effecting a bond therebetween, an improved method for effecting said bond, which comprises rolling a groove on at least one surface near and parallel to the lateral edge of each of said plates, said groove increasing in depth toward the center line of said plate, inserting the resulting grooved edges into said corresponding recesses in said supporting side members, and compressing said supporting side members in a transverse direction substantially parallel to the sides thereof.

3. In the method of fabricating neutronic reactor fuel elements, which comprise a plurality of parallel fuel-bearing plates and a pair of side members supporting said plates, by inserting the lateral edges of said plates into corresponding recesses in said side members, and effecting a bond therebetween, an improved method for effecting said bond, which comprises rolling a groove on only one surface near and parallel to the lateral edge of each of said plates, said groove increasing in depth toward the center line of said plate, inserting the resulting grooved edges into said corresponding recesses in said supporting side members, and compressing said supporting side members in a transverse direction substantially parallel to the sides thereof.

4. In the method of fabricating neutronic reactor fuel elements, which comprise a plurality of parallel fuel-bearing plates and a pair of side members supporting said plates, by inserting the lateral edges of said plates into corresponding recesses in said side members, and effecting a bond therebetween, an improved method for effecting said bond, which comprises dove-tailing the lateral edges of said fuel plates, inserting the resulting dove-tailed edges into said corresponding recesses in said supporting side members, preferentially heating said side members with respect to said plates, and compressing said supporting side members in a transverse direction substantially parallel to the sides thereof.

5. The improved method of claim 4 within said preferential heating of said side members is accomplished in a heated jig.

6. In the method of fabricating neutronic reactor fuel elements, which comprise a plurality of parallel fuel-bearing plates and a pair of side members supporting said plates, by inserting the lateral edges of said plates into corresponding recesses in said side members, and effecting a bond therebetween, an improved method for effecting said bond, which comprises rolling a groove on at least one surface near and parallel to the lateral edge of each of said plates, said groove increasing in depth toward the center line of said plate, inserting the resulting grooved edges into said corresponding recesses in said supporting side members, preferentially heating said side members with respect to said plates, and compressing said side members in a transverse direction substantially parallel to the sides thereof.

7. The improved method of claim 6 wherein said preferential heating of said side members is accomplished in a heated jig.

References Cited in the file of this patent

UNITED STATES PATENTS

| | | |
|---|---|---|
| 164,379 | Kloman | June 15, 1875 |
| 2,236,180 | Kost | Mar. 25, 1941 |
| 2,831,806 | Wigner et al. | Apr. 22, 1958 |
| 2,947,678 | Gimera et al. | Aug. 2, 1960 |
| 2,981,673 | Johnson | Apr. 25, 1961 |

OTHER REFERENCES

TID-7559 (Part I), Fuel Elements Conference, May 1958, pp. 48, 49 and 51.